Feb. 9, 1971 V. A. HOMAN 3,561,824
CONE SEPARATOR
Filed May 22, 1968 2 Sheets-Sheet 1

Virgil A. Homan
INVENTOR.

BY Clarence A. O'Brien
and Harvey B. Jackson
Attorneys

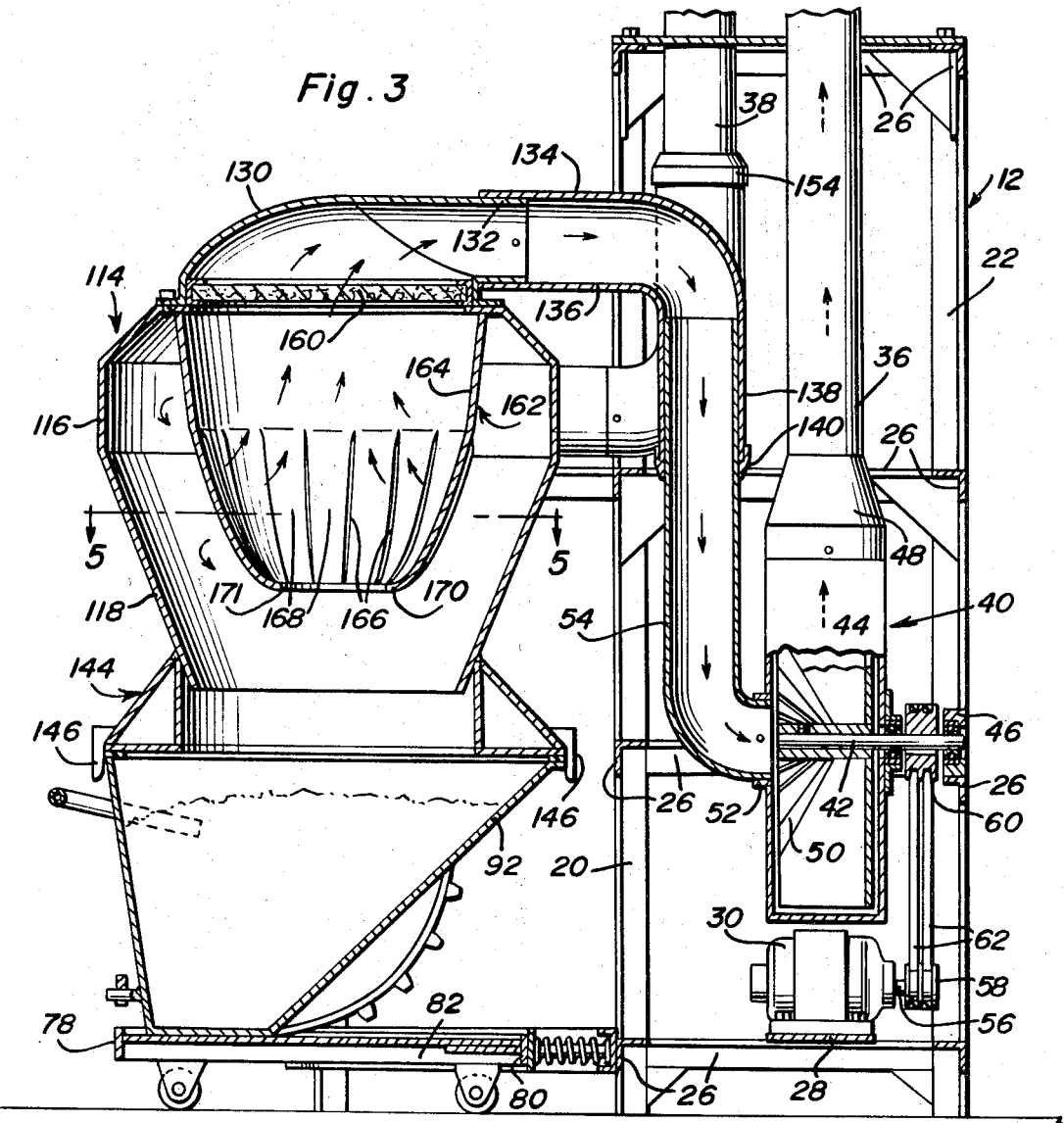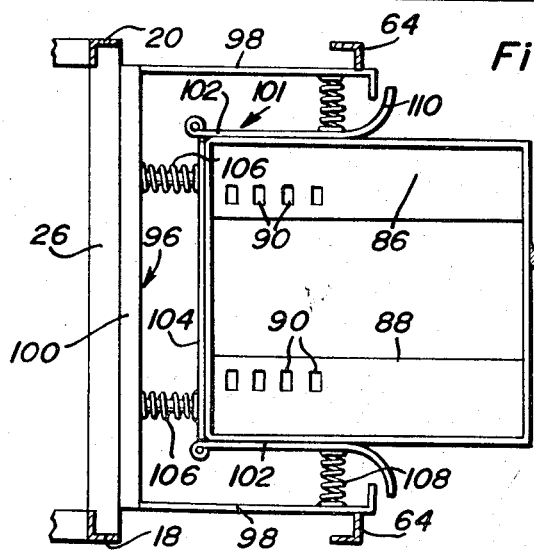

United States Patent Office 3,561,824
Patented Feb. 9, 1971

3,561,824
CONE SEPARATOR
Virgil A. Homan, St. Henry, Ohio
(Parker Shady Acres, St. Marys, Ohio 45885)
Filed May 22, 1968, Ser. No. 731,185
Int. Cl. B65g 53/40
U.S. Cl. 302—59
9 Claims

ABSTRACT OF THE DISCLOSURE

A stand from which a downwardly opening hood is supported for vertical adjustment, the hood having first and second vacuum lines opening into the hood at their inlet and outlet ends, respectively, and an upwardly opening and horizontally shiftable receptacle disposed beneath the hood with the hood being lowerable to a position closing the upper end of the receptacle in reasonably good air-tight sealed engagement therewith and the receptacle being horizontally shiftable outwardly from beneath the hood when the latter is in its raised position. The outlet end of the first vacuum line is adapted for connection with a suitable source of vacuum and the inlet end of the second vacuum line is adapted to be positioned adjacent the cutting member of a cutting tool adapted to perform cutting operations on a workpiece. Further, the hood is constructed in the form of a cone separator.

---

The separator has been specifically designed for use in collecting chips from large milling machines and is adapted specifically for use in conjunction with Roura Hoppers. The collector is operatively communicated by any suitable conduit means with a source of vacuum at its outlet end and with the cutting head of a milling machine or the like at its inlet end. Vacuum is utilized to pick up the chips formed by the milling machine and to convey the chips into the separator portion of the collector in which the chips are separated from the air passing through the collector. The chips which are separated are allowed to fall downwardly into the Roura Hopper with which the collector is operatively associated and the cone separator portion of the collector is supported from a suitable stand for vertical adjustment whereby the collector may be raised relative to the associated Roura Hopper when the latter becomes filled and the hopper may then be withdrawn from beneath the separator portion of the collector and replaced by an empty hopper prior to the separator portion of the collector being lowered downwardly into operative association with the empty hopper. In this manner, chips from a milling machine may be collected as they are formed and discharged into a proper receptacle. Further, as each hopper becomes full of chips, it may be readily replaced by an empty hopper with little or not shutdown time of the associated milling machine being involved.

The main object of this invention is to provide a chip collector for vacuuming smoke, chips and dust from the cutting area of a milling machine and for conveying the collected material from a milling machine to a separation point having a chip collecting receptacle operatively associated therewith.

Another object of this invention is to provide an apparatus in accordance with the preceding object constructed in a manner whereby the receptacles operatively associated with the separation apparatus may be readily replaced by empty receptacles as each receptacle becomes full.

Still another object of this invention is to provide a cone separator apparatus of novel construction including improved flow characteristics rendering it possible to separate even lighter chip particles from the airstream passing therethrough.

A further object of this invention is to provide a cone separator specifically adapted for use in conjunction with a replaceable chip receptacle such as a conventional form of Roura Hopper.

A final object of this invention to be specifically enumerated herein is to provide a cone separator construction which will conform to conventional forms of manufacture, be of simple construction and efficient in operation so as to provide a device that will be long lasting, economically feasible and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is an enlarged vertical sectional view taken subtantially upon the plane indicated by the section line 3—3 of FIG. 2;

FIG. 4 is a fragmentary horizontal sectional view taken substantially upon the plane indicated by the section line 4—4 of FIG. 1.

Figure 1:
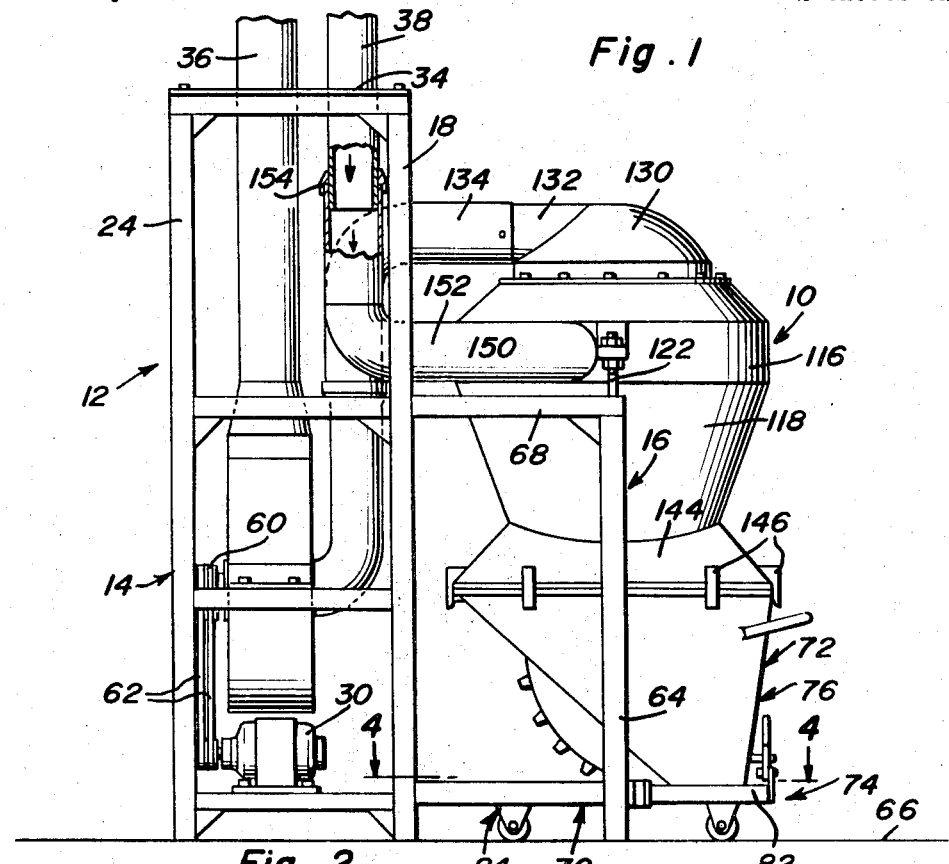
FIG. 1 is a side elevational view of the cone separator operatively associated with a conventional form of Roura Hopper.
Figure 2:
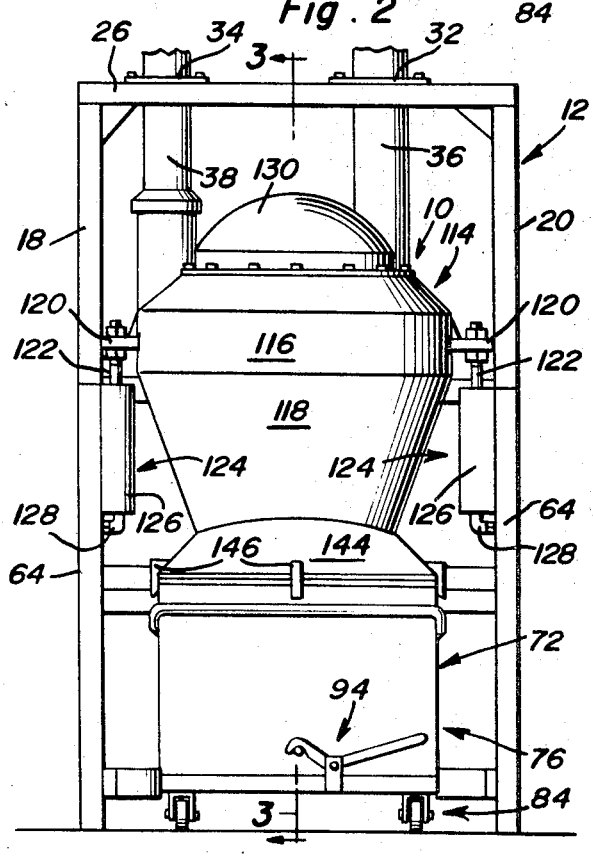
FIG. 2 is a front elevational view of the assemblage illustrated in FIG. 1.

Referring now more specifically to the drawings, the numeral 10 generally designates the cone separator assembly which includes a support stand referred to in general by the reference numeral 12.

The stand 12 consists of a main section referred to in general by the reference numeral 14 and a laterally offset section generally referred to by the reference numeral 16. The section 14 includes four generally vertical corner uprights 18, 20, 22 and 24 suitably interconnected by means of a plurality of generally horizontal brace members 26 secured between each pair of adjacent uprights at four different elevations. A lower plate 28 is supported between the lowermost opposite side brace members 26 and an electric motor 30 is supported from the lower plate 28. In addition, a pair of upper plates 32 and 34 are secured between the front and rear uppermost brace members 26 and support an exhaust conduit 36 and a vacuum inlet line 38, respectively, therefrom. Further, a heavy capacity blower assembly referred to in general by the reference numeral 40 is provided and is supported from the stand 12 between the opposite side brace members 26 spaced second from the bottom of the section 14. The blower assembly 40 includes an input shaft 42 rotatably journaled from the housing 44 of the blower assembly 40 as well as from a journal block 46 supported from the rear brace member 26 spaced second from the bottom of the main section 14.

The housing 44 of the blower assembly 40 includes an exhaust neck 48 to which the inlet end of the exhaust conduit 36 is secured. Further, the blower assembly 40 includes a centrifugal type air impeller 50 mounted on the shaft 42 and the housing 44 includes an inlet neck 52 to which the outlet end of a vacuum conduit or line 54 is connected. Of course, the electric motor 30 includes an output shaft 56 on which a pair of drive pulleys 58 are mounted and the shaft 42 has a pair of driven pulleys 60 mounted thereon. The pulleys 58 and 60 are aligned and a pair of drive belts 62 are entrained about corresponding pulleys 58 and 60.

The laterally offset section 16 of the support stand 12 includes a pair of opposite side uprights 64 forwardly displaced from the forward uprights 18 and 20. The lower ends of the uprights 64 may be secured to the support surface 66 for the support stand 12 in any convenient manner and the upper ends of the uprights 64 are braced relative to the uprights 18 and 20 by horizontal brace members 68. The lower portion of the laterally offset section 16 includes a receptacle receiving and positioning assembly referred to in general by the reference numeral 70 adapted to accurately position a Roura Hopper assembly referred to in general by the reference numeral 72.

The Roura Hopper assembly includes a wheeled supporting frame portion generally referred to by the reference numeral 74 and an upper receptacle portion generally referred to by the reference numeral 76. The frame portion 74 includes front and rear frame members 78 and 80 interconnected by means of opposite side frame members 82 and a plurality of depending support wheel assemblies referred to in general by the reference numeral 84. A pair of opposite side support plates 86 and 88 are interconnected between the front and rear members 78 and 80 and the plates 86 and 88 include sets of longitudinally spaced apertures 90.

The receptacle portion 76 is supported from the frame portion 74 for limited rolling movement from the upright position of the receptacle portion 76 illustrated in FIGS. 1 and 3 of the drawings to an inclined position with the inclined wall 92 of the receptacle portion 76 inclined downwardly toward the open portion of the receptacle portion 76 which opens upwardly when the receptacle portion 76 is positioned as illustrated in FIGS. 1 and 3 of the drawings. A latch assembly generally referred to by the reference numeral 94 is provided on the frame portion 74 and is operable to releasably retain the receptacle portion 76 in the position thereof illustrated in FIGS. 1 and 3 of the drawings and the wheeled frame portion 74 is snugly receivable between the uprights 64 and may be accurately positioned in the desired location by the assembly 70.

The assembly 70 includes a generally horizontally disposed U-shaped frame referred to in general by the reference numeral 96 including a pair of opposite side legs 98 interconnected by means of a bight portion 100. The bight portion is supported from the forward lowermost brace member 26 and the legs 98 extend between the opposite ends of the bight portion 100 and the lower ends of the uprights 64. The assembly 70 also includes a generally horizontally disposed inner frame referred to in general by the reference numeral 101 and which is also generally U-shaped in configuration. The frame 101 includes a pair of opposite side leg portions 102 which have their base end portions pivotally secured to the opposite ends of an interconnecting bight portion 104. The bight portion 104 is supported from the bight portion 100 by means of compression springs 106 and the free ends of the leg portions 102 are supported from the free ends of the legs 98 by means of compression springs 108. Further, the free ends of the leg portions 102 curve outwardly away from each other as at 110 so as to define a self-centering entrance throat for the wheeled frame portion 74 of the Roura Hopper assembly 72 whereby the frame portion 74 may be properly centered between the uprights 64.

A hood assembly generally referred to by the reference numeral 114 is supported from the laterally offset section 16 of the support stand 12. The hood assembly 114 includes a generally cylindrical outer portion 116 provided with lower inverted truncated cone-shaped sidewall portions 118 and a pair of outstanding opposite side mounting lug portions 120 to which the upper free ends of the piston rod portions 122 of a pair of fluid cylinders generally referred to by the reference numeral 124 are secured. The cylinder portions 126 of the cylinders 122 are supported from the uprights 64 in any convenient manner and include fluid inlet fittings 128 which may be suitably communicated with any source of fluid under pressure. Therefore, it may be appreciated that the hood assembly 114 may be raised and lowered relative to the laterally offset section 16 of the support stand 12. The fluid motors 124 provide a guiding action for the hood assembly 114 during its vertical adjustment and the upper end of the outer portion 116 of the hood assembly 114 is closed by an outlet cover 130 defining an outlet neck 132 telescoped into the inlet end 134 of an L-shaped pipe 136 whose outlet end 138 is telescoped over the inlet end of the vacuum line 54 and includes seal means 140 for forming a relatively airtight seal between the L-shaped pipe 136 and the vacuum line 54. Of course, the outlet end 138 of the L-shaped pipe 136 is slidingly telescoped over the inlet end of the vacuum line 54 whereby sealed communication between the blower assembly housing 44 and the outer portion 116 of the hood assembly 114 is maintained even during vertical shifting of the hood assembly 114 relative to the laterally offset section 16 of the support stand 12.

The lower ends of the sidewall portions 118 are enclosed by means of an adapter construction referred to in general by the reference numeral 144 which is sealingly secured to the sidewall portions 118 and adapted for sealed engagement with the open upper end of the receptacle portion 76 of the Roura Hopper assembly 72. The adapter assembly 144 includes cam-type centering elements 146 which are engageable with the upper edges of the receptacle portion 76 to ensure that the adapter assembly 144 forms a relatively good airtight seal with the open upper end of the receptacle portion 76.

The outer portion 116 includes an inlet neck 150 which opens tangentially into the outer portion 116 of the hood assembly 114 and comprises the outlet end of an inlet pipe 152. The inlet end of the inlet pipe 152 is telescoped over and includes a sliding fit with the outlet end of the vacuum inlet line 38 and includes seal means 154 for forming a relatively good airtight seal with the vacuum inlet line 38. The inlet end of the inlet pipe 152 is vertically disposed and therefore means is provided for relative movement between the inlet pipe 152 and the vacuum inlet line 138 as well as between the L-shaped outlet pipe 136 and the vacuum line 54 during vertical shifting of the hood assembly 114 relative to the laterally offset section 16 of the support stand 12.

The outlet cover 130 includes a removable air filter panel 160 in its inlet portion and the hood assembly 114 further includes an upwardly opening cup-shaped baffle construction 162 whose open upper edges are sealingly supported from the portions of the hood assembly 114 extending about the juncture between the outer portion 116 and the cover 130. The sidewall portions of the baffle construction 162 are imperforate in their upper portions to a level extending downwardly at least generally horizontally aligned with the inlet neck 150 and the lower portions of the side walls 164 of the baffle construction 162 are provided with vertical slots 166 and portions of the side walls 164 disposed between adjacent slots 166 are slightly rotated about their longitudinal axes so that their edge portions facing in the direction of the flow of air about the outer portion 116 determined by the tangential inlet neck 150 are inclined outwardly. Thus, the portions of the side walls 164 disposed between the slots 160 form what can be considered inclined vanes 168. The cup-shaped baffle construction 162 tapers downwardly and includes a partial annular bottom wall 170 which is of minimum radial extent defining an inlet opening 171 between its inner peripheral edge portions.

In operation, the inlet end of the vacuum inlet line 38 may be disposed closely adjacent the cutting head of any machine adapted to perform cutting operations on a workpiece. In this respect, the instant invention is similar to the chip collector and exhauster disclosed in my copending U.S. application Ser. No. 697,346, filed Jan. 12, 1968. After the inlet end of the vacuum inlet line 38 has been properly positioned and the Roura Hopper assembly 72 has been operatively associated with the lower portion of the hood assembly 114, the electric motor 30 may be operated whereby the blower assembly 40 will vacuum cuttings, smoke and dust from areas adjacent the cutting head. The cuttings, smoke and dust will be conveyed through the vacuum inlet line 38 with the air pumped therethrough by the blower assembly 40 and be discharged tangentially into the outer portion 116 of the hood assembly 114. Accordingly, the air discharged into the hood assembly 114 will flow rapidly in a counterclockwise direction about the upper portion of the hood assembly 114 between the cylindrical wall portions of the outer portion 116 and the imperforate upper wall portions 164 of the baffle construction 162. Rapid movement of heavier particles conveyed in the air pumped through the hood assembly 114 will therefore move outwardly and engage the inner surface portions of the outer portion 116. Inasmuch as the main opening 171 for the discharge of air from the hood assembly 114 is disposed in the lower portion of the outer portion 116 of the hood assembly 114, the majority of air to be discharged from the hood assembly 114 moves downwardly in the outer portion 116 and then upwardly into and through the outlet opening 171. Of course, by this time the heavier particles conveyed in the air have been spun outwardly toward engagement with the sidewall portions 118 of the outer portion 116 and do not exit through the opening 171 but merely fall downwardly into the receptacle portion 76 of the Roura Hopper assembly 72.

Figure 5:
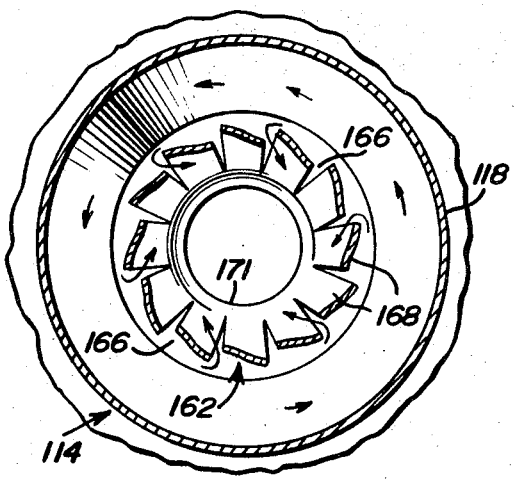
FIG. 5 is a fragmentary horizontal sectional view taken substantially upon the plane indicated by the section line 5—5 of FIG. 3.

In order to reduce the velocity of air passing upwardly through the opening 171, the volume of air which is forced to pass through the opening 171 is reduced by the provision of the slots 166 which serve to remove some of the air pumped into the hood assembly 114. While these slots 166 extend upwardly into the upper portions of the hood assembly 114 and therefore might be operative to allow some of the airborne particles to enter the baffle construction 162, in asmuch as the vanes or blades 168 are twisted about their longitudinal axes as illustrated in FIG. 5 of the drawings, the vanes 168 preclude any of the airborne particles in the upper portion of the hood assembly 114 from passing into the baffle construction 162. Any air entering the baffle construction 162 through the slots 166 must negotiate a sharp 180° turn in order to enter the slots 166 against the dominant counterclocwise flow of air about the upper portion of the interior of the outer portion 116. Accordingly, it may be seen that slots 166 serve an important function in providing a means whereby a reasonably large percentage of air pumped through the hood assembly 114 may enter the baffle construction 162 other than through the opening 171. Thus, the velocity of air moving through the opening 171 is substantially reduced over that which would be present if the slots 166 were not provided and accordingly, the possibility of airborne particles entering the baffle construction 162 through the opening 171 is substantially eliminated. Therefore, substantially all airborne particles entering the hood assembly 114 will fall downwardly into the receptacle portion 76 of the Roura Hopper assembly 72. Of course, some lighter particles of smoke will enter the baffle construction 162 through the slots 166 and the opening 171 and these lighter particles may be filtered out of the airstream entering the cover 130 by means of the air filter panel 160, which panel may be readily replaced when desired.

As soon as the receptacle portion 76 of the Roura Hopper assembly 72 has become full of collected material, the hood assembly 114 may be raised by means of the fluid motors 124 and held in a raised position while the full Roura Hopper assembly 72 is removed and an empty hopper assembly is substituted therefor. The empty hopper assembly may be readily properly positioned relative to the support stand 12 and the lower position of the hood assembly 114 by means of the receiving and centering assembly 70 whereby the replacement of an empty hopper for a full hopper will require but a short period of time.

If it is desired to construct a simplified form of the invention, the hood assembly 114 may be stationarily supported from the stand 12, thus eliminating the sliding connections between the hood assembly 114 and the exhaust conduit 36 and the vacuum inlet line 38. However, with such a modified structure, the cone-shaped sidewall portions 118 will terminate downwardly in a downwardly projecting discharge neck including a sliding connection with a separate hood or cover for the hopper assembly 72 to be utilized in lieu of the adapter assembly 144. Such a separate hood cover would be supported from the stand 12 by fluid motors corresponding to fluid motors 124 and thus vertically adjustable relative to the stand 12 and the hopper assembly 72.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cone separator including a closed upstanding generally cylindrical shell, a fluid inlet neck opening tangentially into the upper end portion of said shell whereby the velocity of fluid entering said shell will cause fluid within the shell to swirl about the upper end portion thereof, an upstanding tubular fluid outlet baffle centrally disposed in said shell opening upwardly and outwardly through the top of said shell and including an open lower inlet end terminating downwardly above the lower end of said shell and below said inlet neck, and a centrally disposed outlet opening in the bottom of said shell below the lower inlet end of said tubular outlet baffle, the sidewalls of at least the lower end of said outlet baffle having openings formed therethrough, said openings in said outlet baffle side walls comprising upstanding slots.

2. The combination of claim 1 wherein the upper ends of said slots terminate below a horizontal plane containing said inlet neck.

3. The combination of claim 2 wherein the lower ends of said slots terminate above the lower end of said outlet baffle.

4. A cone separator including a closed upstanding generally cylindrical shell, a fluid inlet neck opening tangentially into the upper end portion of said shell whereby the velocity of fluid entering said shell will cause fluid within the shell to swirl about the upper end portion thereof, an upstanding tubular fluid outlet baffle centrally disposed in said shell opening upwardly and outwardly through the top of said shell and including an open lower inlet end terminating downwardly above the lower end of said shell and below said inlet neck, and a centrally disposed outlet opening in the bottom of said shell below the lower inlet end of said tubular outlet baffle, the sidewalls of said outlet baffle having circumferentially spaced upstanding slots formed therein defining elongated upstanding vanes between pairs of adjacent slots, said vanes being at least slightly rotated about their longitudinal axes in a direction opposite to the direction in which said inlet neck opens into said shell.

5. The combination of claim 4 wherein the sidewalls of said shell are downwardly convergent at least throughout a major portion of the lower half of said shell.

6. The combination of claim 5 wherein the sidewalls of at least the lower end of said outlet baffle are downwardly convergent.

7. The combination of claim 5, said separator being supported above a generally horizontal support surface for vertical shifting relative to said surface, a debris hopper supported from and horizontally movable over said surface into and out of position disposed below and in vertical registry with said outlet opening, said hopper including sidewall upper marginal edge portions defining an upwardly opening inlet for said hopper, said shell including means disposed about said outlet opening adapted to form a generally airtight seal with said sidewall upper marginal edge portions when said shell is lowered relative to said support surface toward said hopper.

8. The combination of claim 7 wherein the last-mentioned means includes means engageable with said sidewall upper marginal edge portions operable to horizontally cam said receptacle into final exact vertical registry with said outlet opening upon final downward movement of said shell into airtight sealed engagement with said upper marginal edge portions.

9. The combination of claim 8 wherein said shell includes air inlet and outlet pipes including vertically extending portions, and air inlet and outlet conduits stationarily supported relative to said support surface and telescopingly engaged with the inlet and outlet ends of said inlet and outlet pipes.

References Cited

UNITED STATES PATENTS

| | | | |
|---|---|---|---|
| 1,395,701 | 11/1921 | Cain | 214—41 |
| 1,542,057 | 6/1925 | Hovden | 302—17 |
| 2,010,231 | 8/1935 | Heist | 302—59 |
| 3,219,394 | 11/1965 | Moss et al. | 302—59 |
| 3,236,565 | 2/1966 | Kester et al. | 302—59 |

FOREIGN PATENTS

| | | | |
|---|---|---|---|
| 278,563 | 11/1964 | Holland | 302—59 |

ANDRES H. NIELSEN, Primary Examiner

U.S. Cl. X.R.

302—17